US000001108H

United States Statutory Invention Registration [19]

[11] Reg. Number: H1108

Wynveen et al. [43] Published: Oct. 6, 1992

[54] AIR PURIFICATION SYSTEM

[75] Inventors: Rick A. Wynveen, Pepper Pike; Franz H. Schubert; Daniel C. Walter, both of Chardon; Robert N. Schmidt, Cleveland, all of Ohio

[73] Assignee: The United States of America as represented by the Secretary of the Army, Washington, D.C.

[21] Appl. No.: 860,331

[22] Filed: Mar. 30, 1992

Related U.S. Application Data

[63] Continuation of Ser. No. 706,422, May 28, 1991, abandoned.

[51] Int. Cl.[5] ..... B01D 53/04

[52] U.S. Cl. ..... 55/28; 55/68; 55/74; 55/208; 55/269; 55/387; 588/200

*Primary Examiner*—Donald P. Walsh
*Assistant Examiner*—Daniel Jenkins
*Attorney, Agent, or Firm*—Anthony T. Lane; Edward Goldberg; Michael Sachs

[57] ABSTRACT

A fluid purification system is provided for contaminated fluids such as air contaminated with a wide spectrum of chemical warfare agents which includes two adsorption chambers with adsorption medium suitable for effectively removing chemical warfare agents from a stream of air; a valve selection device adapted for directing a stream of contaminated air to one or the other of the adsorption chambers, for directing a stream of contaminant-free air from the adsorption chamber, for directing a stream of regeneration fluid to one or the other adsorption chambers requiring regeneration and for directing a fluid stream with a concentration of contaminants from a regenerated adsorption chamber; a fluid stream diverter device adapted for diverting a portion of contaminant-free fluid from one or the other adsorption chambers for use as a regeneration fluid stream for regeneration of the adsorption medium in one or the other adsorption chambers; and a temperature regulation device for heating the regeneration fluid stream to a temperature effective for regeneration of the adsorption medium in the adsorption chambers.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR PURIFICATION SYSTEM

GOVERNMENTAL INTEREST

The Government has rights in this invention pursuant to Contract No. DAAK-11-81-C-0028 awarded by Department of the Army.

This application is a continuation of application Ser. No. 07/706,422, filed May 28, 1991, now abandoned.

FIELD OF THE INVENTION

The present invention relates to fluid purification systems and, more particularly, to mobile purification systems employing adsorbents for removing a broad spectrum of toxic and noxious contaminants including chemical warfare agents from contaminated fluid streams such as air in protected enclosures, armored vehicles and the like, the purification system having means for regeneration of the adsorption medium in situ without shutting down the purification system.

BACKGROUND OF THE INVENTION

There are many different techniques used to achieve the desired separation of contaminants from air and other fluid streams. When the contaminant concentration is not large in comparison to the bulk stream, two techniques, adsorption and absorption are generally effective. On occasion, additional components are added to adsorbents to enhance the benefits of physical adsorption by utilizing chemisorption. However, utilizing either an absorbent agent or an adsorbent agent with added chemisorption components results in a purification system that is not readily regenerable, whereas utilizing physical adsorption alone allows for the regeneration of the adsorption agents, in general, either by pressure or temperature variation techniques. The weight and complexity of many regeneration systems, in general, limits their feasibility for use in mobile applications.

One area where adequate purification of a fluid stream has life and death consequences is in the defense against chemical warfare agents. In the past, specially treated activated charcoal adsorption medium have been developed capable of adsorbing a broad spectrum of chemical warfare agents ranging from low molecular weight agents such as hydrogen cyanide and cyanogen chloride to high molecular weight (nerve agents) agents such as soman and sarin and very large agents such as "BZ" and "VX".

The present state-of-the-art for Chemical Defense Collective Protection for enclosures, armored vehicles and the like utilizes such specially treated activated charcoal adsorption medium in filters and the like devices, but they have been found to exhibit many drawbacks. The filters have limited shelf life, are readily fouled by a variety of nontoxic contaminants such as water and various hydrocarbon vapors, require frequent replacement and they cannot be regenerated, necessitating replacement, typically, while the protective system is shut down.

SUMMARY OF THE INVENTION

It is accordingly an object of the present invention to provide a fluid purification system for use in personnel protection enclosures, armored vehicles and the like that utilizes adsorption medium suitable to effectively remove a broad spectrum of chemical warfare agents from streams of air wherein the adsorption medium can be regenerated while the air purification system is maintained in service.

It is another object of the present invention to provide a mobile air purification system for use in protected enclosures, armored vehicles and the like which includes an adsorption medium that would effectively remove a broad spectrum of chemical warfare agents from a stream of air and the like, and wherein the adsorption system could be regenerated in situ without the need for replacement of the adsorption medium or shutting down operation of the air purification system.

It is a further object of the present invention to provide a process for purification of streams of air contaminated with chemical warfare agents in personnel protection enclosures, armored vehicles and the like which effects the purification of streams of contaminated air and regeneration of the air purification adsorption medium without the need to remove or replace such medium or to shut down the air purification system while regenerating the adsorption medium.

In accordance with the present invention there is provided a process for the purification of a stream of contaminated fluid such as air contaminated with a broad spectrum of chemical warfare agents which comprises:

a) providing a first adsorption medium means for adsorption of contaminants in a contaminated stream of fluid and a second adsorption medium means associated with said first adsorption medium means for adsorption of contaminants in said contaminated stream of fluid;

b) treating a stream of contaminated fluid with said first adsorption medium means for the time needed to form a stream of substantially contaminant-free fluid;

c) discharging said stream of contaminant-free fluid exiting from said first adsorption medium means after diverting a portion of said stream of said contaminant-free fluid to provide a regeneration fluid stream;

d) heating said diverted regeneration fluid stream to a temperature high enough to desorb contaminants adsorbed by said second adsorption medium means from a contaminated fluid stream treated thereby;

e) treating said second adsorption medium means containing contaminants adsorbed from a stream of contaminated fluid with said heated regeneration fluid stream for the time necessary to regenerate said second adsorption medium means by desorbing and flushing contaminants from said second adsorption medium means;

f) discharging said regeneration fluid stream with a concentration of contaminants desorbed from said second adsorption medium means;

g) cooling said regenerated second adsorption medium means to a temperature effective for said second adsorption medium means to treat a stream of contaminated fluid;

h) treating a stream of contaminated fluid with said second adsorption medium means while said associated first adsorption medium means is regenerated using steps c) through g) hereof; and i) repeating said steps b) through h) until terminated by an operator.

In accordance with another aspect of the present invention there is provided apparatus for the purification of a stream of contaminated fluid which comprises:

a) a first adsorption chamber means having adsorption medium means for adsorption of contaminants from a stream of contaminated fluid and a second adsorption chamber means associated with said first adsorption chamber means having adsorption medium means for adsorption of contaminants from a stream of contaminated fluid;

b) adsorber switching valve means adapted for directing a stream of contaminated fluid to one of said first and second adsorption chamber means, for directing a stream of contaminant-free fluid from one of said first and second adsorption chamber means, for directing a stream of regeneration fluid to one of said first and second adsorption chamber means and for directing a stream of fluid with concentrated contaminants from one of said first and second adsorption chamber means;

c) fluid diversion means adapted for diverting a portion of a stream of contaminant-free fluid from a bulk of said stream of contaminant-free fluid and directing said diverted stream to a temperature regulation means;

d) temperature regulation means for heating a stream of contaminant-free fluid and for directing a stream of heated contaminant-free fluid to said adsorber switching means; and e) temperature regulation means for directing a stream of cooled contaminant-free fluid to said adsorber switching means.

Other objects, features and advantages will be readily apparent from the following detailed description of preferred embodiments thereof taken in conjunction with the drawing.

BRIEF DESCRIPTION OF THE DRAWINGS

For the purpose of illustrating the invention, there are shown in the accompanying drawings embodiments which are presently preferred; it being understood that the invention is not intended to be limited to the precise arrangements and instrumentalities shown.

DESCRIPTION OF THE PREFERRED EMBODIMENTS

Figure 1:
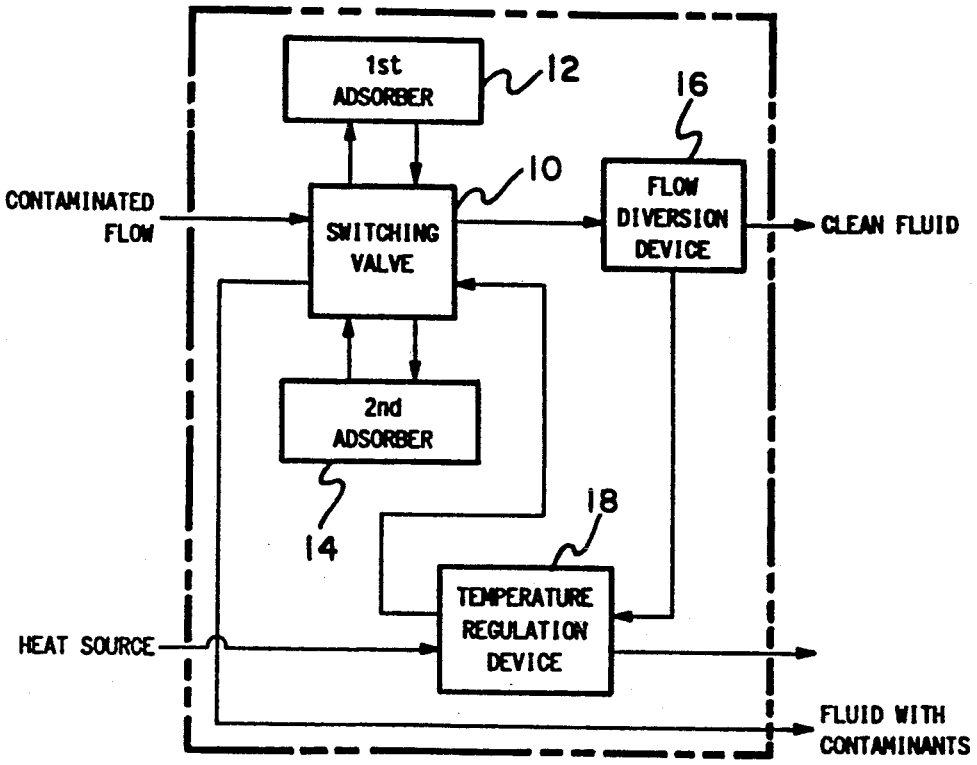
FIG. 1 is a schematic block flow diagram showing an air purification system with regeneration capabilities according to the invention.

Turning now to further and more specific details of the present invention and with reference to the drawings, wherein FIG. 1 is shown the fluid purification system of the invention which may, for example, be used for a variety of mobile applications including protecting military personnel inside protected enclosures, armored vehicles and the like. The system shown in FIG. 1 includes two adsorption chambers 12 and 14; an adsorber switching valve 10 which is adapted to direct a feed stream of contaminated fluid such as air containing chemical warfare agent contaminants to one of the two adsorption chambers 12, 14, a contaminant-free air stream from the adsorption chamber for use and/or further processing, a regeneration feed stream of fluid to one of two adsorption chambers 12, 14 requiring regeneration, and the stream of fluid with concentrated contaminants from one of two adsorption chambers being regenerated; a flow diversion device 16; a temperature regulation device 18; and associated devices and controls. Adsorber switching valve 10, which is adapted to direct contaminated and regeneration air feed streams to one of the two adsorption chambers 12, 14, includes, for example, two valve housings and associated valve components, a single drive mechanism, a valve positioning device and associated controls.

In operation according to the practice of the invention, a stream of contaminated fluid such as air containing chemical warfare agent contaminants is continuously fed by way of a suitable blower, pump, compressor or the like to the adsorber switching valve 10. It is preferential that the contaminated stream be cooled and free of water droplets before entering adsorption chambers 12, 14. The contaminated fluid stream enters one of the valve housings 10*a* of the switching valve 10 and is directed thereby to an adsorption medium in the first absorption chamber 12 where the contaminants are removed by adsorption. The contaminant-free fluid stream exits from the adsorption chamber 12 to a different valve housing 10*b* in the switching valve 10 and is then directed by the switching valve 10 to a flow diversion device 16 which is adapted to separate the flow of contaminant-free fluid into two streams.

The flow diversion device 16 contains two piping branches, one or both of which may contain restriction orifices to adjust pressure drops to provide the desired flows in each direction; or it may contain a pump or compressor in one or both piping branches to provide the motive force for the fluid through each branch. The first branch in the flow diversion device 16 conveys a bulk of the contaminant-free fluid out of the system where the clean fluid is then available for use. In the second branch, a portion of the clean fluid is directed to a temperature regulation device 18 where the clean fluid is heated by a heat source to serve as a regeneration fluid stream. The hot, clean regeneration fluid stream is then returned to the adsorption switching valve 10 where it is directed to and through the second adsorption chamber 14 which is in the regenerating mode. The heated regeneration fluid stream serves to desorb contaminants from the adsorption medium and flush then from the second adsorption chamber 14. The regeneration fluid stream which is now concentrated with contaminants exits from the second adsorption chamber 14 to the switching valve 10 where it is directed to the waste stream outlet of the system. The waste stream with concentrated contaminants may be further processed, flared or vented to the atmosphere, depending on the circumstances.

After regeneration, cooling of the regenerated adsorption chamber 14 and adsorption medium therein is initiated. Initiation of the cooling operation may be controlled by any one of the following: a timer; the temperature of the waste stream outlet; or chemical analysis of the waste stream outlet. The cooling operation is commenced by deactivating the temperature regulation device 18 and the regeneration fluid stream flows through the adsorber switching valve 10 and the regenerated adsorption chamber 14 until the regenerated chamber 14 is cooled to or near the adsorption operating temperature. It would be evident that the temperature regulation device 18 may be of the type which could be adapted to assist in cooling the regeneration fluid stream. After cooling, the switching valve 10 can then be adapted to allow the regenerated second adsorption chamber 14 to be used for adsorption of contaminants from a contaminated stream of fluid while the first adsorption chamber 12 is regenerated. The process can be repeated as indicated above until it is terminated by the operator.

Figure 2:
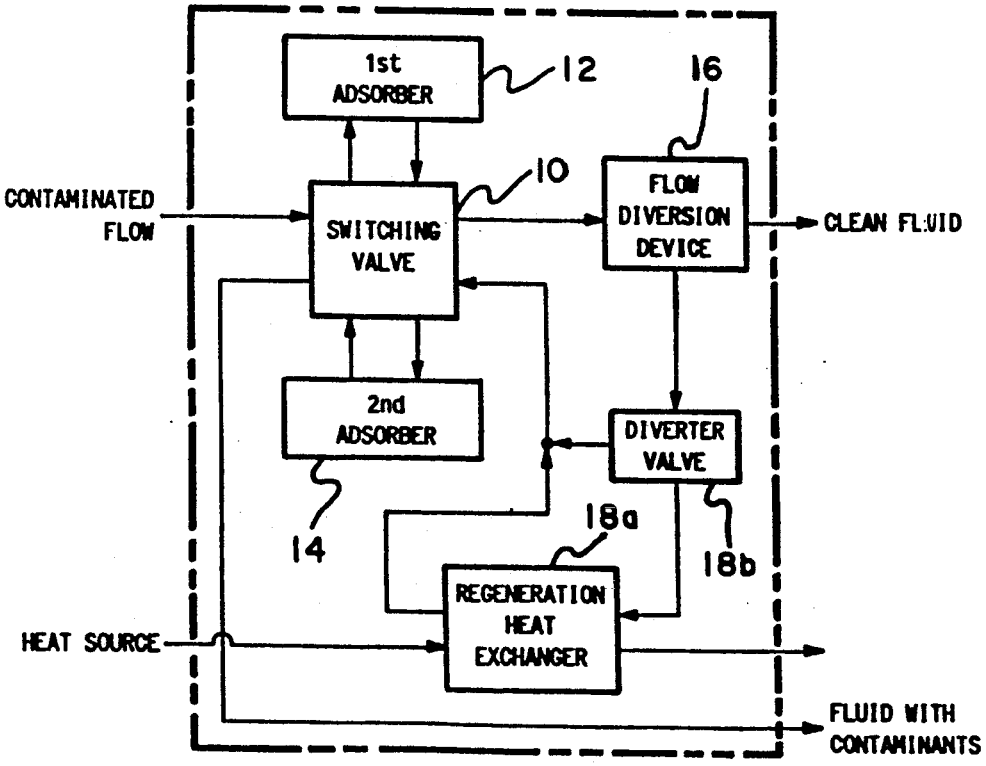
FIG. 2 is a schematic block flow diagram illustrating a preferred arrangement of apparatus for carrying out the air purification and regeneration process of the present invention.

Referring now to FIGS. 2, there is shown a preferred embodiment of the air purification system in accordance with the invention which can be a mobile system used to protect miliary personnel inside protective enclosures or armored vehicles. The system includes a regeneration heat exchanger 18*a* and diverter valve 18*b* which serve as the temperature regulation device for the regeneration fluid stream.

In operation of the system shown in FIG. 2, the contaminated stream of fluid would be treated as described hereinabove with a bulk of the contaminant-free stream of fluid produced thereby being discharged for use and a portion of the contaminant-free stream being used as the regeneration fluid stream. The portion of clean fluid diverted by the flow diversion device 16 as the regeneration fluid is directed to the diverter valve 18*b*. Diverter valve 18*b*, which can be any conventional valve with temperature sensor controlled, motor drive valve positioning means or the like, directs a portion of the regeneration fluid stream to the regeneration heat exchanger 18*a*. Another portion of the regeneration fluid stream is directed by valve 18*b* to by-pass the regeneration heat exchanger 18*a*, and is used to assist in controlling the temperature of the regeneration fluid stream being directed to the adsorber switching valve 10 prior to entering the adsorption chamber 14 undergoing regeneration. The upper temperature limit of the regeneration fluid stream used to regenerate the adsorption medium in adsorption chamber 14 can vary, generally depending upon the temperature limits of the adsorption medium to be regenerated and the limitations of the heat source. The maximum temperature limits of the adsorption medium are dependent upon the adsorbent's physical characteristics and by the ignition temperature of the adsorbent containing adsorbed contaminants. The heat source for the regeneration heat exchanger 18*a* may be provided by exhaust gases from an engine, steam, electric heat or any other auxiliary power unit or heat source.

The adsorption chambers 12 and 14 contain adsorption media of activated charcoal although other suitable adsorbents may be clay, zeolite such as molecular sieves, and the like, or mixtures thereof. Adsorption of contaminants such as chemical warfare agents from fluid streams such as air can be effectively achieved at temperatures below ambient. Preferably, adsorption of such chemical warfare agent is efficiently effected at temperatures between about 32° F. and 50° F. which eliminates problems with icing of water. These temperatures may be achieved by cooling the contaminated fluid prior to it entering the process. If the ambient temperature of the contaminated fluid is below 32° F., additional cooling is not required. Regeneration of the adsorption medium at temperatures above 300° F. to about 400° F. effects adequate desorption of the chemical warfare agents while not posing an ignition hazard to the activated charcoal.

Figure 3:
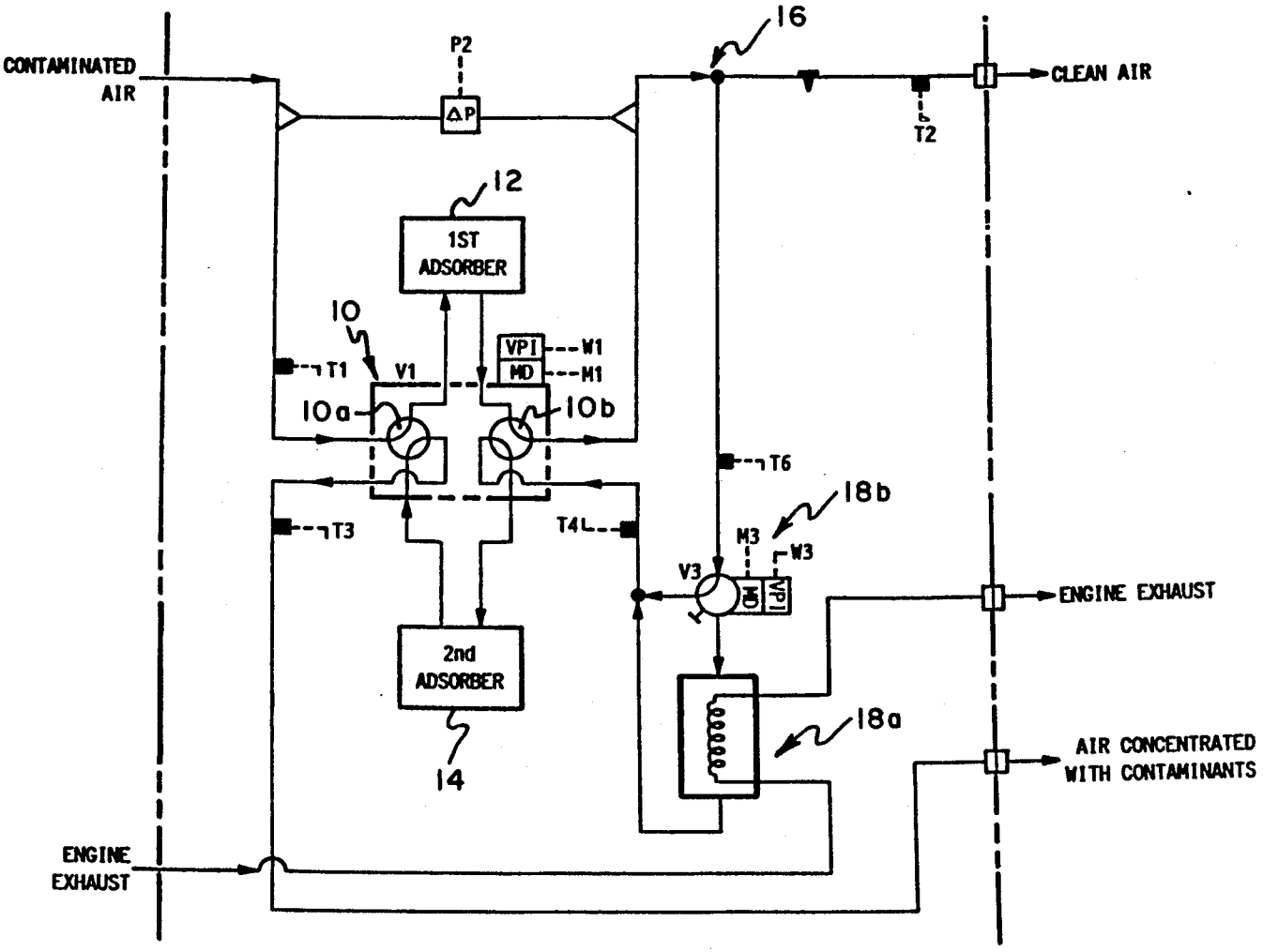
FIG. 3 is a schematic drawing of the control elements used in the system and process of the invention.

In FIG. 3 is shown a schematic diagram illustrating the temperature and pressure sensors and interrelationship thereof with associated equipment used to control operation of the air purification and regeneration system of the invention shown in FIG. 2. The temperature sensors T1, T2, T3, T4 and T6 are the primary control elements for the process, P2 is a differential pressure sensor used to determine if there is a blockage of the adsorption beds in adsorption chambers 12 and 14. In this connection, valve position indicators, VPI, provide the signals to the electronic controller to remove power for the motor drivers, MD, used to position the valves in adsorber switching valve 10; Temperature sensor T4 controls the diverter valve 18*b*, sensor T6 senses the temperature of the regeneration feed stream to the heat exchanger 18*a*, sensor T3 senses the temperature of the regeneration fluid stream exiting from the adsorption chamber during the regeneration and cooling cycles.

It would be evident that the fluid purification system herein described with particular emphasis on its use for removing chemical warfare agent contaminants from air, with modifications based on the teaching herein could be applicable for a various stationary and preferably mobile applications including purifying natural gas streams, water streams, petrochemical fluid streams and a variety of other such industrial and military applications.

Although the fluid purification system and process of the invention have been illustrated in the foregoing detailed description, it should be appreciated that other variations may be made. Accordingly, the invention is not intended to be limited to the specific embodiments or examples set forth in the specification, but rather is limited only by the appended claims.

What is claimed is:

1. A process for the purification of a stream of contaminated fluid which comprises the steps of:

a) providing a first adsorption medium means for adsorption of contaminants in a contaminated stream of fluid and a second adsorption medium means associated with said first adsorption medium means for adsorption of contaminants in said contaminated stream of fluid;

b) treating a stream of contaminated fluid with said first adsorption medium means for the time needed to form a stream of substantially contaminant-free fluid;

c) discharging said stream of contaminant-free fluid exiting from said first adsorption medium means after diverting a portion of said stream of contaminant-free fluid to provide a regeneration fluid stream;

d) heating said diverted regeneration fluid stream to a temperature high enough to desorb contaminants adsorbed by said second adsorption medium means from a stream of contaminated fluid treated thereby without causing ignition thereof;

e) treating said second adsorption medium means containing contaminants adsorbed from a stream of contaminated fluid with said heated regeneration fluid stream for the time necessary to regenerate said second adsorption medium means by desorbing and flushing contaminants from said second adsorption medium means;

f) discharging said regeneration fluid stream with a concentration of contaminants desorbed from said second adsorption medium means;

g) cooling said regenerated second adsorption medium means to a temperature effective for said second adsorption medium means to treat a stream of contaminated fluid;

h) treating a stream of contaminated fluid with said second adsorption medium means while said associated first adsorption medium means is regenerated using steps c) through g) hereof; and i) repeating said steps b) through h) until terminated by an operator.

2. The process as claimed in claim 1, wherein said stream of contaminated fluid is a stream of air contaminated with chemical warfare agents.

3. The process as claimed in claim 1, wherein said adsorption medium means includes activated charcoal.

4. The process as claimed in claim 1, wherein said regeneration fluid stream is heated to a temperature at least 300° F.

5. The process as claimed in claim 1, wherein said regenerated second adsorption means is cooled to a temperature at or below ambient temperature.

6. The process as claimed in claim 1, wherein treatment of a stream of contaminated fluid by said first and second adsorption medium means is carried out at a temperature of from about 32° F. and 50° F.

7. Apparatus for the purification of a stream of contaminated fluid which comprises:

a) a first adsorption chamber means having adsorption medium means for adsorption of contaminants from a stream of contaminated fluid and a second adsorption chamber means associated with said first adsorption chamber means having adsorption medium means for adsorption of contaminants from a stream of contaminated fluid;

b) adsorber switching valve means adapted for directing a stream of contaminated fluid to one of said first and second adsorption chamber means, for directing a stream of contaminant-free fluid from one of said first and second adsorption chamber means, for directing a stream of heated regeneration fluid to one of said first and second adsorption chamber means and for directing a stream of fluid with concentrated contaminants from one of said first and second adsorption chamber means;

c) fluid diversion means adapted for diverting a portion of a stream of contaminant-free fluid from a bulk of said stream of contaminant-free fluid and directing said diverted stream to a temperature regulation means;

d) temperature regulation means for heating a stream of contaminant-free fluid and for directing a stream of heated contaminant-free fluid to said adsorber switching means; and e) temperature regulation means for directing said stream of cooled contaminant-free fluid to said adsorber switching means.

8. The apparatus as claimed in claim 7, wherein said temperature regulation means includes heat exchanger means.

9. The apparatus as claimed in claim 8, wherein the heat source for said heat exchanger is provided by exhaust gases from a vehicle engine.

10. The apparatus as claimed in claim 7, wherein said adsorption medium means includes a bed of activated charcoal.

* * * * *